United States Patent Office 2,746,916
Patented May 22, 1956

2,746,916

PRODUCTION OF LACTOBIONIC ACID AND ITS δ-LACTONE

Edward R. Magariello, Islip, N. Y., assignor to National Dairy Research Laboratories, Inc., Islip, N. Y., a corporation of Delaware No Drawing. Application February 20, 1952,
Serial No. 272,713

7 Claims. (Cl. 204—79)

This invention relates to a process for the preparation of lactobionic acid and its δ-lactone starting from lactose.

Lactose has long been available in the dairy industry in large quantities but the end uses have been limited. Thus several million pounds of lactose are available annually for which the markets have remained uncertain. Moreover, even larger amounts of lactose might be obtained from other sources such as cheese whey, were new valuable end uses of lactose to be found. This problem naturally has been the subject of much investigation.

One line of inquiry has been directed toward derivatives of lactose. The conversion of lactose to lactobionic acid by oxidation has been described in the literature. Several procedures have been proposed, particularly bacterial action, more fully described in U. S. Patent No. 2,496,297 to Lockwood and Stodola, dated February 7, 1950, and electrolysis. The electrolysis process is the most attractive for large-scale industrial use, and is described in U. S. Patents Nos. 1,976,731 and 1,980,996, dated October 16 and November 20, 1934, respectively, to Horace S. Isbell with the possibility of such use in view. This procedure results in an aqueous solution of calcium lactobionate, but the acid has proved exceptionally difficult to isolate in a solid form and, in fact, no successful procedure has yet been described. Only syrups seem to be obtainable, and these are hard to handle. For this reason, calcium lactobionate has been isolated instead, using the various crystallization procedures set forth in the Isbell patents referred to and also in the literature (for example, Isbell, Bureau of Standards Journal of Research, volume 11, pages 713 to 716 (1933), RP 618) and Hudson and Isbell (Bureau of Standards Journal of Research, volume 3, page 57 (1929), RP 82). These procedures have not, however, proved fully adaptable to a large-scale industrial operation.

To separate the lactobionic acid from the crude electrolysis reaction mixture as a basic calcium salt, lime can be added to the solution in accordance with the procedure described by Hudson and Isbell. However, the accompanying strongly alkaline solution causes severe decomposition of any unoxidized lactose and effectively prevents the satisfactory operation of a continuous process in which the stripped liquor is returned to the reaction vessel for reuse. This difficulty can be avoided by precipitating lactobionic acid in the form of the calcium bromide double salt of calcium lactobionate. This, however, introduces another step into the process, for the calcium lactobionate-calcium bromide must then be converted to calcium lactobionate by treatment with hydrated lime (Isbell, Bureau of Standards Journal of Research, volume 17, pages 334 and 335 (1936), RP 914). Each of these methods, moreover, involves crystallization, which means concentrating dilute solutions to a high enough concentration, seeding, and then waiting for crystals to form, and therefore is not very practical industrially.

Lactobionic acid δ-lactone is a crystalline compound and if a procedure were available for the isolation of the lactobionic acid in the crude electrolysis reaction mixture as this compound, an alternative process would be available. The procedure available for the preparation of the δ-lactone is, however, extraordinarily time-consuming, as is shown by Isbell (Bureau of Standards Journal of Research, volume 11, at page 717 (1933), RP 618). The lactobionic acid solution is first evaporated in vacuo to a syrup which then is dehydrated by distillation with dioxane and toluene until a dry residue is obtained. The residue is mixed with dioxane and toluene and the process repeated. Finally, the residue is triturated with dioxane and allowed to stand until it has crystallized. This last step, the author reports, requires several weeks.

It is evident that utilization of lactose as lactobionic acid and related derivatives has been inhibited heretofore by the unavailability of procedures which are easy to carry out and which can be applied on a large scale.

Accordingly, it is an object of the present invention to provide a process for the production of lactobionic acid from lactose which is adapted for application to large quantities of lactose and which can be carried forward on a large scale.

It is a further object of the invention to improve the existing electrolytic process for the oxidation of lactose to lactobionic acid and devise a process for producing concentrated solutions of lactobionic acid and which could be adapted for continuous operation.

It is also an object of the invention to provide a process for the rapid conversion of lactobionic acid into its δ-lactone.

It is an additional object of the invention to provide a process for the preparation of aqueous solutions of lactobionic acid which are substantially free from inorganic ions.

Another object of the invention is the provision of lactobionic acid δ-lactone in a crystalline form substantially free from lactose and inorganic salts.

In general outline, the process of the invention includes the steps of subjecting lactose to electrolysis in an aqueous solution in the presence of a catalyst selected from the group consisting of iodine and bromine catalysts and an alkaline substance in an amount to maintain the pH above about 5.2, treating the crude electrolysis reaction solution with cation and anion exchange resins to remove inorganic ions, and spray-drying the effluent aqueous lactobionic acid solution to convert the lactobionic acid therein into a dry mixture of acid and δ-lactone.

A supplemental feature of the oxidation step of the invention includes the use of bromine as the catalyst, and permitting the bromine to act upon the lactose, thereby reducing the bromine to a bromide and oxidizing part of the lactose to lactobionic acid, then continuing the oxidation electrolytically in which step the bromide serves as a catalyst for the electrolytic oxidation. As a further feature, the oxidation is preferably carried out in an aqueous solution saturated with respect to lactose, and, desirably containing excess undissolved lactose.

The deionization of the crude electrolysis reaction mixture is carried out with the aid of cation and anion exchange resins. The solution is passed through separate beds of cation and anion exchange resins or, if desired, through a mixed bed of these resins, to obtain an effluent substantially free from inorganic cations and anions. Whenever possible, it is of assistance, prior to treating the solution with the ion exchange resins, first to precipitate the metal cations with the aid of an acid with whose anion the metal cation forms an insoluble salt; for example, where the alkaline substance is a calcium salt, then sulfuric acid can be employed to precipitate the calcium as calcium sulfate.

The crude product obtained after spray-drying the effluent contains unoxidized lactose and unconverted lactobionic acid. The lactone can be purified by recrystallizing the product from a suitable solvent, such as a monoether of an aliphatic glycol.

It will be understood that although each of the steps of the process of the invention outlined above in combination cooperate to produce a final product, crystalline lactobionic acid δ-lactone, the process can be interrupted at any desired intermediate stage, and the intermediate isolated. For example, the crude electrolysis reaction solution can be employed in the preparation of salts of lactobionic acid such as calcium lactobionate-calcium bromide, or calcium lactobionate can be isolated therefrom, all according to the procedures known to those skilled in the art and described in the literature referred to above. Also, the effluent obtained by treatment of this solution with the ion exchange resins can be used for the preparation of these salts if desired. Other uses for the intermediate products obtained in this process will be evident to those skilled in the art.

The details of each step of the process now will be considered.

*Electrolytic oxidation of lactose to lactobionic acid*

The electrolytic oxidation of lactose employed in the instant invention is a modification of the process described by Isbell in U. S. Patents Nos. 1,976,731 and 1,980,996, and in the Bureau of Standards Journal of Research, volume 6, page 1145 (1931), RP 328.

In this process, an alkaline substance, which may be a base or an alkaline salt or buffer, as desired, is employed, to maintain the solution at a pH above about 5.2, to reduce side reactions and decomposition. Calcium carbonate, lime, barium carbonate and magnesium oxide can be used as the alkaline substance. Calcium salts are preferred because of their low cost and the ease of precipitation of calcium from the crude electrolysis reaction solution. If pure products are required, sodium salts are less desirable because of the difficulty of removing sodium from the electrolysis reaction solution even with the aid of ion exchange resins.

A bromine or iodine catalyst is added to expedite the oxidation and increase the conductivity of the solution, thus reducing its resistance and the amount of energy required to effect the desired oxidation. The terms "bromine catalyst" and "iodine catalyst" as used in the specification and claims include bromine, hydrogen bromide, iodine, hydrogen iodide and salts of these halogens, such as sodium bromide, calcium bromide and calcium hypobromite and the corresponding iodides.

Bromine is a preferred catalyst because it is less expensive than either sodium or calcium bromide, the most available bromide salts. If bromine is added to a solution of lactose in water, the bromine reacts with the water to form hypobromite and this, in turn, oxides lactose to lactobionic acid (calcium lactobionate in the presence of calcium carbonate) the hypobromite being reduced to the bromide by this reaction. The amounts of bromine required for reasonably good catalytic action are capable of oxidizing about 6.5% of the lactose. Thus it is evident that this reaction can be employed to advantage to reduce the cost of the electrolysis, and when bromine is used as the catalyst, it is possible to complete the oxidation electrolytically using less than the theoretical amount required. It is, therefore, preferred, when bromine is employed as a catalyst, to permit it to oxidize the lactose until substantially all of the bromine has been converted into bromide. Thereafter the current is turned on and the oxidation is continued by electrolysis. In the course of the electrolysis, bromide is reconverted into hydrobromite and the oxidation cycle is repeated.

In the process described by Isbell, the oxidation is carried out with an approximately 8% solution of lactose. This method gives a satisfactory oxidation, and can be used in the process of this invention, but the use of a dilute lactose solution results in the production of a relatively dilute solution of lactobionic acid which must be concentrated before any attempts at isolation can be successfully carried out.

It has been found that the concentration step can be eliminated and a more efficient oxidation obtained if an aqueous solution saturated with respect to lactose, and containing excess undissolved lactose, is subjected to electrolytic oxidation. Lactose is soluble in water only to the extent of about 17% at the temperature at which the oxidation is conducted i. e. at about 25 to 30° C. However, lactobionic acid and its calcium salt are extremely soluble in water. It has been found, quite unexpectedly, that as the oxidation proceeds and lactobionic acid is formed, thus removing lactose in solution, excess undissolved lactose dissolves, and the oxidation continues until all of the lactose present in the cell, whether initially in solution or not, is oxidized. The same result is obtained by continuously adding lactose to the solution as it is consumed, but there is no disadvantage in adding all the lactose that is to be oxidized at the start of the reaction.

Excellent yields approximating 98% or more are obtainable when quantities of excess lactose (i. e., above the saturation level of 17%) sufficient to give a 30 to 40% solution of lactobionic acid are employed. At concentrations above this the current density begins to fall off after the oxidation is approximately 75% complete. Solutions containing sufficient lactose to produce a 54% solution of lactobionic acid have been oxidized successfully in accordance with the process of the invention, but best yields are obtainable at solutions of 40% lactobionic acid concentration or below.

Use of saturated solutions of lactose containing excess undissolved lactose has the further advantage that larger amounts of acid can be obtained from the same size of electrolytic cell with less handling of chemicals, and a smaller excess of alkaline substance per pound of lactose can be used, making separation of inorganic salts easier later. Also, the percent of unchanged lactose present as an impurity is lower in proportion to the large amount of lactobionic acid that is produced.

The amount of catalyst is not critical. The lower limit is set by the amount needed to give a noticeable improvement in current efficiency.

The current efficiency is calculated by dividing the theoretical number of faradays (or amp, hrs.) necessary to complete the oxidation by the actual number of faradays (or amp. hrs.) that are used in the process. The theoretical amount of current necessary to oxidize one mole of lactose and convert it into lactobionic acid is 2 faradays.

An increase in current density with increasing amounts of catalyst lowers the current efficiency, so that it appears that when the larger amounts of catalyst are employed, side reactions are enhanced. There is no reason, therefore, to employ more catalyst than is necessary to obtain a high yield at a low current density. Amounts of catalyst within the range from 6 to 12%, based on the weight of lactose used, are indicated by these considerations.

The potential across the electrodes is not critical, but a minimum of 1.6 volts is indicated. A potential of 9 volts has been employed with disadvantage, but a satisfactory reaction is obtained at 6 to 7 volts, and it is not necessary therefore to employ higher voltages. The current density increases as the distance between the electrodes is reduced, but it is essential to maintain proper agitation of the reaction mixture between the electrodes and thus enough room should be left to maintain proper agitation.

The process is applicable to lactose from a wide variety of sources. Excellent current efficiencies of 98.5% or higher are obtainable with pure lactose. When a crude lactose is employed, the current efficiency ranges upwards from 93%. Filtered thin whey syrup can be used, but this material contains other substances which are affected by the electrolysis. Nitrogen-containing materials which may be present in the form of protein undergo the Hofmann reaction, and urea can also be oxidized by bromine. Thus, current efficiencies employing whey may range as low as 30%. However, the whey can be purified by removal of such materials prior to the reaction. It has been observed that if the color bodies are removed from such a syrup as, for example, by treating it with 19% Nuchar C-1000-N, the oxidation can be carried out with a current efficiency of 86%, suggesting that the color bodies are responsible for low current efficiency. Other types of Nuchar carbons can be used, but C-1000 appears to be the most effective for this purpose.

The oxidation of lactose electrolytically is an exothermic reaction. Over a period of 136 minutes, it has been observed that the temperature of the reaction mixture may rise as much as 25° C. At temperatures above about 35° C., some hydrolysis of lactose and lactobionic acid appears to take place. Moreover, foaming, which normally accompanies the oxidation reaction, is greater at the higher temperatures. In view of this, it is usually desirable to maintain the temperature at 25° C. or below by cooling the electrolytic cell.

The foaming which occurs during oxidation can be controlled with commercially available anti-foaming agents. DC Antifoam A, which is a silicone defoamer, has been used successfully in amounts approximating 0.5 gram of Antifoam in a toluene suspension per pound of lactose. The less pure the lactose, the greater the amount of foam that appears to be produced.

The course of the reaction can be followed by observing the optical rotation of the reaction mixture. The rotation decreases as the amount of lactose decreases and the change is linear. The optical rotation depends upon the concentration of lactose employed. When a saturated solution is employed, the initial optical rotation is approximately +8.8° and decreases to approximately +4.6° when the reaction has reached 98% of completion.

*Deionization of the crude electrolysis reaction solution*

The crude electrolyzate contains lactobionic acid, in the form of calcium lactobionate, unchanged lactose and various inorganic salts, including the bromide catalyst and the alkaline substance employed as a buffer. The salts must be removed if a solution of salt-free pure lactobionic acid is to be obtained. This can be done by treating the solution with ion exchange resins. However, a smaller amount of ion exchange resin will be required if a major proportion of the cation of the alkaline substance is removed first by precipitation. Of course, this can only be done when the cation of the alkaline substance forms an insoluble salt with an acid, as in the case of calcium and magnesium, but the step is especially desirable in the case of calcium salt.

The precipitation is carried out by adding acid to the reaction mixture. In the case of calcium 8 normal sulfuric acid solution is added until the pH is approximately 2.5. The solution is allowed to stand until precipitation is complete. This may require nine hours or more, in the case of calcium sulfate. Then the precipitate is removed by filtration.

The solution then is treated with cation and anion exchange resins. The resins can be in a mixed bed, but a conventional two-bed system can be used, and inasmuch as this is the more complicated of the two procedures, the following description will be devoted to the two-bed system.

The first step is the conversion of the lactobionic salt to the free acid by removal of cations with a cation exchange resin in the acid cycle. Any of the cation exchange resins available to the art can be employed, but it is preferred that the resin be strongly acidic. The nuclear sulfonic acid-type cation exchange resins, which contain a large plurality of sulfonic acid groups in the resin molecule substituted on an aromatic isocyclic or heterocyclic ring or an aliphatic chain substituted in an aromatic ring, are quite satisfactory for this purpose. Nuclear sulfonic acid type resins available commercially are Amberlite IR-120, Dowex 50 (described in Patent No. 2,366,007) and Nalcite HCR. Strongly acidic carboxylic acid-type resins such as chloroacetic-containing resins also are satisfactory.

The crude electrolyzate is allowed to run downflow through the resin bed, e. g., at a rate approximating 0.1 volume per minute per volume of resin. The effluent emerging from the cation exchange resin column is substantially free of all inorganic impurities except hydrobromic acid and possibly sulfate anion. The anions of strong acids can be removed from the solution through use of a weak anion exchange resin, such as Amberlite IR-4B and Amberlite IR-45, Deacidite, Duolite A2, and Wofatit M.

The decationized lactobionic acid solution is introduced into the anion exchange column downflow, e. g. at a rate of approximately 0.1 volume per minute per volume of resin. The effluent contains lactobionic acid and a trace of unchanged lactose with very negligible proportions of calcium and bromide ion.

The ion exchange resins can be regenerated with acids and bases in conventional ways and further details of these steps need not be given inasmuch as they are well known to those skilled in the art.

*Conversion of lactobionic acid to lactobionic acid δ-lactone*

The effluent lactobionic acid solution is spray-dried to convert it at least partially to lactobionic acid δ-lactone. It appears that the drying temperature is important, inasmuch as at low temperatures a produce relatively high in lactobionic acid is obtained. The speed of the drying may also be of importance. Conventional spray-drying equipment can be used; in the examples, the process is illustrated using a Bowen spray drier equipped with either a vane atomizing wheel or an atomizing pressure nozzle.

Optimum drying conditions for the Bowen spray drier appear to be an inlet air temperature in the range of 280 to 300° F. and an outlet air temperature within the range of 190 to 210° F. The upper limit to the drying temperatures is fixed by the softening point of lactobionic acid δ-lactone and the lower limit is important to the conversion of the acid to the lactone.

The feed should have a solids content of at least 15% and preferably from 30 to 40% for best results.

The crude product obtained from the spray drier can be characterized as a commercial grade of lactone, and can be utilized as the lactone for most purposes, such as the preparation of other lactobionic acid derivatives. The crude product is a mixture of lactone and unconverted acid, and is contaminated with small amounts of lactose.

A crude spray-dried product containing δ-lactone can be "boosted" in lactone content to over 90% by heating it in an oven at from 150° to 185° F. for from 18 to 35 hours. This product is less hygroscopic than the original spray-dried product. Strangely enough, a tray-dried product cannot be subjected to this oven treatment, probably because a glass-like material is formed which clings strongly to the water released in conversion of acid to lactone.

If an absolutely pure product is required, the lactose can be removed from the crude product by crystallizing the spray-dried or spray- and oven-dried product from a solvent, either alone or mixed with a nonsolvent such as dioxane. Residual lactobionic acid can be converted to lactone by oven-drying, as stated above. Aliphatic glycols and their monoethers are good solvents, the latter being preferred. Satisfactory monoethers of aliphatic glycols include, for example, the monomethyl and monoethyl ethers of ethylene glycol, the monomethyl ether of diethylene glycol and the monobutyl ether of ethylene glycol.

The crude product is dissolved by adding it in portions with stirring to from 4 to 5 times its weight of the hot glycol ether. An excess of solvent over and above the solvent necessary to just dissolve the crude product has been found desirable in facilitating solution, but is not essential. The solution is decanted from any insoluble residue and then concentrated in vacuo to about one-half its volume and allowed to cool slowly with stirring. Crystals usually form spontaneously but the solution may be seeded with lactone if desired. The crystalline precipitate is separated by filtration and desirably washed with small amounts of the same solvent, then with ethyl ether and dried.

A second crop of crystals can be obtained by combining the wash liquors of glycol ether with the residual solution, concentrating in vacuo and cooling as before.

The combined yield of purified δ-lactone represents about 40 or 45% of the weight of crude product. The low yields are due in large part to losses of the lactone in the solvents. The purified product melts between 203 and 205° C. This is to be compared with the reported melting point of 195 to 196° C. Paper chromatographic analysis shows that the product is substantially free from lactose and other inorganic impurities and is also free from inorganic salts.

The process of the invention is illustrated by the following examples.

EXAMPLE 1

The electrolytic cell employed in this example was constructed of ¾" plywood protected by a covering of Tygon paint and fitted with a cooling tube. Fourteen graphite plate electrodes 6" by 12" by ½" were fitted in in the cell 1⅜" apart. At the center of the cell a space 5½" wide was placed between the plates to provide room for an air-driven agitator. Direct current was supplied by a battery charger, and a recording ammeter and voltmeter were fitted in the electical circuit. Two ion exchange resin columns were provided having a capacity of 7 gallons each.

At the start of the operation, a charge of 40 lbs. of crude lactose, 2.5 lbs. of bromine, 10 lbs. of calcium carbonate, 85 lbs. of water and 80 milliliters of a 25% suspension of DC Antifoam A in toluene was placed in the cell. The bromine was allowed to react with the lactose until no further reaction was apparent. In this initial oxidation step approximately 6.5% of the lactose was oxidized. The oxidation was then continued electrolytically.

A potential of 7 volts was placed across the electrodes and this potential developed a current of from 35 to 45 amperes. The temperature of the reaction mixture tended to rise and, therefore, was maintained by cooling at 30° C. or below. The oxidation was complete after approximately 2450 ampere hours. The theoretical number of ampere hours would be 2700, and this would have been required had the bromine not oxidized part of the lactose.

The crude electrolytic reaction mixture had a solids content approximating 35%. The calcium ion was next largely removed by precipitation with sulfuric acid. Enough 8 N sulfuric acid was added to the reaction mixture to bring the pH to approximately 2.5. The solution was then allowed to stand for at least 9 hours and preferably overnight at room temperature and then the precipitated calcium sulfate was removed by filtration. The resulting solution contained small proportions of calcium and sulfate ions, bromide ion, lactobionic acid and unconverted lactose, and is deionized by passing it through beds of cation and anion exchange resins.

The deionized effluent from the ion exchange resins is spray-dried. A Bowen 5-ft. spray drier can be employed using either a vane atomizing wheel or an atomizing pressure nozzle.

A vane atomizing wheel is operated at a speed approximating 14,000 R. P. M. An optimum feed has a solids content of 30% and its flow rate is 3.65 gallons per minute. Inlet air temperature is from 300 to 305° F. and outlet air temperature is 190 to 210° F.

Atomization with a pressure nozzle can also be conducted on a feed having a solids content of 30%. An optimum flow rate is 4.4 gallons per hour, at an inlet air temperature of 280° F., and an outlet air temperature of 205 to 210° F. The pressure nozzle atomizer gives a finer powder than the vane atomizing wheel.

The crude lactobionic acid δ-lactone obtained from the spray drier generally melts over a wide range, usually beginning at about 110 to 115° C. The melting point of the pure lactone is reported at 195 to 196° C. The dry powder contains about 3% water (determined by drying to constant weight), lactobionic acid and a small percentage of lactose possibly with small amounts of galactose and gluconic acid. The crude lactone can be purified further by recrystallization from methyl Cellosolve (ethylene glycol monomethyl ether).

The crude lactone is dissolved by adding it in portions with stirring to about 4 to 5 times its weight of hot (about 90° C.) methyl Cellosolve. The solution is decanted from any insoluble residue, concentrated in vacuo to about one-half its volume and allowed to cool gradually with stirring. The crystalline precipitate which forms on cooling is removed by filtration, washed with small amounts of methyl Cellosolve and ethyl ether and dried. By working up the combined methyl Cellosolve solutions, a second crop of lactone can be obtained. M. P. 195–196° C.

EXAMPLE 2

A charge containing 1080 grams of crude lactose, 6 liters of water and 300 grams of calcium carbonate was placed in a water-cooled laboratory-type cell. To this suspension 71 grams of bromine was added. After the initial reaction which was carried out at 25° C. was complete, a potential of 6 volts was applied across the plates and the oxidation continued at a current density of about 0.36 amps./dm.² at approximately 20° C. The oxidation was 99% complete after 5.37 faradays had passed through the solution. The theoretical number of faradays would be 6.0.

After the oxidation was complete, the unused calcium carbonate was reclaimed by filtration, and then 8 N sulfuric acid added to the filtrate until the pH was 2.5. This mixture was allowed to stand overnight and the calcium sulfate which formed was removed by filtration. Removal of the calcium still remaining in solution was effected by passing the filtrate downflow through a column of cation exchange resin IR–120. The effluent from this column was sent downflow through a column of anion exchange resin IR–45 to remove the sulfate and bromide ions. The resulting effluent was essentially a solution of lactobionic acid.

This solution was spray-dried, using an inlet air temperature of 300° F. and an outlet air temperature of 190–210° F. at a flow rate of 0.5 gallon per minute. White lactobionic acid δ-lactone (crude, containing lactose and lactobionic acid) was obtained. M. P. 115–120° C.

EXAMPLE 3

A water-cooled electrolytic cell of the type described in Example 1 was charged with 40 lbs. of crude lactose, 11 lbs. of calcium carbonate and 85 lbs. of water. To this mixture 25 lbs. of bromine were added slowly while the mixture was agitated. After the initial reaction between the bromine and lactose had subsided, the oxidation was completed electrolytically with a current density of approximately 1.0 amp./dm.$^2$.

The reaction mixture was filtered to remove unused calcium carbonate and the filtrate passed through a column of 0.9 cubic foot of IR-120 cation exchange resin. The effluent from this column was sent through a column containing 7.4 liters of IR-45 anion exchange resin. The effluent was spray-dried, at an inlet air temperature of 280° F. and an outlet air temperature of 205-210° F., yielding lactobionic acid δ-lactone (crude, containing lactose and lactobionic acid).

EXAMPLE 4

Example 3 is repeated, but the effluent obtained from the anion exchange column is not spray-dried. Instead it is concentrated under reduced pressure to produce an aqueous syrup containing free lactobionic acid at a high concentration.

EXAMPLE 5

An electrolytic oxidation cell equipped with six electrodes 1" in diameter, an agitator, and cooling coil is charged with 900 g. of crude lactose, 80 g. of calcium bromide, 250 g. of calcium carbonate and 5 l. of water. Two ml. of a 24% solution of "DC Antifoam A" in toluene was added to the reaction mixture and a potential of 6 volts applied across the electrodes.

After the lactose had been oxidized to 97% the reaction was discontinued and the excess calcium carbonate removed by filtration.

The electrolyzate solution was passed through a column of IR-120 cation exchange resin and then through a column of an IR-45 anion exchange resin at a rate of 0.1 volume per minute per volume of resin. The following data are typical of the composition of the effluent as it emerges from the cation exchange resin and from the anion exchange resin:

|  | Crude Electrolyzate | Effluent from the Cation Column | Effluent from the Anion Column |
|---|---|---|---|
| Total Solids............percent.. | 17.5 | 12.7 | 12.0 |
| Ash......................do.... | 3.05 | 0.009 | 0.03 |
| Calcium.................do.... | 1.07 | 0.00 | 0.00 |
| Sodium..................p. p. m.. |  |  | 63 |
| Bromine................percent.. | 0.99 | 0.845 | 0.005 |
| Sulfate.................do.... |  | 0.00 | 0.00 |
| Lactose................ | trace | trace | trace |
| Assumed lactobionic acid..percent.. |  |  | 99.5 |
| Specific Conductance.....mhos.. | 0.01 | 0.034 | 0.0019 |
| pH.................... | 6.5 | 0.96 | 2.5 |

The deionized effluent is spray-dried at an inlet air temperature of 300° F. and an outlet air temperature of 190 to 210° F., and the powder further dried in an oven. The oven-dried product has a δ-lactone content above 90% and is less hygroscopic than the spray-dried powder.

EXAMPLE 6

The aqueous lactobionic acid solution obtained following treatment with ion exchange resins can be utilized as a source of lactobionic acid. It is readily neutralized by addition of bases such as sodium or calcium hydroxide to form the corresponding lactobionates. These can be isolated from the solution by conventional means.

This solution can be deionized, spray-dried and oven-dried as in Example 5 to produce a product containing over 90% lactobionic acid δ-lactone.

Heretofore, lactobionic acid has been readily available in pure form only by dissolving the corresponding calcium salt or the corresponding double salt of calcium lactobionate and calcium bromide or chloride. The solutions thereby obtained are not free from inorganic ions, as is the lactobionic acid solution obtainable in accordance with the instant invention.

The lactobionic acid δ-lactone undergoes many reactions characteristic of those which would be expected of lactobionic acid and thus can be employed as though it were crystalline lactobionic acid for many purposes. Thus, for example, it undergoes reaction with organic primary and secondary amines to form the corresponding lactobionamides. This reaction proceeds smoothly in the presence of an alcohol solvent such as methyl or ethyl alcohol, under reflux, and nearly quantitative yields are obtainable. Esterification can be effected by treating the lactone with an alcohol under suitable conditions. The δ-lactone also will react in solution with bases or basic salts such as sodium hydroxide or silver carbonate to form the corresponding lactobionates. This reaction appears to be instantaneous and can be effected in water at room or slightly elevated temperatures. The salts formed can be separated by addition of alcohol to the solution, followed by digestion and crystallization.

It is known that the lactone is slowly hydrolyzed by water to the acid, and it may be that many of the above reactions, particularly those carried out in aqueous solutions, occur following this hydrolysis. Whatever the reaction mechanism, there is no doubt that the lactone is a valuable starting material for many derivatives of lactobionic acid.

Those skilled in the art will perceive many variations which can be made in the above process without departing from the spirit of the invention, and it will be understood that the invention is not to be limited except as set forth in the claims.

All parts and percentages in the specification and claims are by weight.

I claim:

1. A process for the production of lactobionic acid δ-lactone which comprises subjecting lactose to electrolysis in an aqueous solution in the presence of a catalyst selected from the group consisting of iodine and bromine catalysts and an alkaline substance in an amount to maintain the pH above about 5.2, passing the crude electrolytic reaction solution through strongly acidic cation and weakly basic anion exchange resins, recovering as the effluent aqueous lactobionic acid solution, and spray-drying the effluent solution at a temperature sufficient to convert lactobionic acid to its δ-lactone.

2. A process for the production of lactobionic acid δ-lactone which comprises subjecting lactose to electrolysis in an aqueous solution saturated with respect to lactose and in the presence of a catalyst selected from the group consisting of iodine and bromine catalysts and an alkaline substance in an amount to maintain the pH above about 5.2, passing the crude electrolytic reaction solution through cation and weakly basic anion exchange resins, recovering as the effluent aqueous lactobionic acid solution, and spray-drying the effluent solution at a temperature sufficient to convert lactobionic acid to its δ-lactone.

3. A process for the production of lactobionic acid δ-lactone which comprises first treating lactose with bromine in an aqueous solution saturated with respect to lactose, thereby reducing bromine to bromide and oxidizing lactose to lactobionic acid and then continuing the oxidation by electrolysis in the presence of the bromide and an alkaline substance in an amount to maintain the pH above about 5.2, passing the crude electrolytic reaction solution through cation and weakly basic anion exchange resins, recovering as effluent aqueous solution of lactobionic acid and spray-drying the effluent at a temperature sufficient to convert the lactobionic acid to its δ-lactone.

4. A process for the production of lactobionic acid δ-lactone which comprises subjecting lactose to electrolysis in an aqueous solution saturated with respect to lactose and in the presence of a catalyst selected from the group consisting of bromine and iodine catalysts and an alkaline calcium salt in an amount to maintain the pH above about 5.2, adding an acid with whose anion calcium forms an insoluble salt, in an amount to precipitate at least a major proportion of the calcium ion, passing the solution through cation and weakly basic anion exchange resins, recovering as the effluent aqueous lactobionic acid solution, and spray-drying the effluent at a temperature sufficient to convert lactobionic acid to its δ-lactone.

5. A process for the production of lactobionic acid δ-lactone which comprises subjecting lactose to electrolysis in an aqueous solution saturated with respect to lactose and in the presence of a catalyst selected from the group consisting of iodine and bromine catalysts and an alkaline substance in an amount to maintain the pH above about 5.2, passing the crude electrolytic reaction mixture through cation and weakly basic anion exchange resins, recovering as the effluent aqueous lactobionic acid solution, and spray-drying the effluent at a temperature approximating 300° F. to convert lactobionic acid to its δ-lactone.

6. A process for the production of pure lactobionic acid δ-lactone, substantially free from inorganic salts and lactose, which comprises subjecting lactose to electrolysis in an aqueous solution and in the presence of a catalyst selected from the group consisting of iodine and bromine catalysts and an alkaline substance in an amount to maintain the pH above about 5.2, passing the crude electrolytic reaction mixture through strongly acidic cation and weakly basic anion exchange resins, recovering as the effluent aqueous lactobionic acid solution, spray-drying the effluent at a temperature sufficient to convert lactobionic acid to its δ-lactone, and further drying the spray-dried product in an oven to increase the yield of lactone.

7. A process for the production of lactobionic acid δ-lactone which comprises passing a crude electrolytic reaction solution comprising lactobionic acid, a catalyst selected from the group consisting of iodine and bromine catalysts, and an alkaline substance through acidic cation and weakly basic anion exchange resins, recovering as the effluent aqueous lactobionic acid solution and spray-drying the effluent solution at a temperature sufficient to convert lactobionic acid to its δ-lactone.

References Cited in the file of this patent
UNITED STATES PATENTS

| | | |
|---|---|---|
| 1,976,721 | Isbell | Oct. 16, 1934 |
| 2,240,116 | Holmes | Apr. 29, 1941 |
| 2,388,222 | Behrman | Oct. 30, 1945 |
| 2,413,676 | Behrman et al. | Jan. 7, 1947 |
| 2,551,519 | Winters et al. | May 1, 1951 |
| 2,560,504 | Day et al. | July 10, 1951 |
| 2,564,820 | Smit | Aug. 21, 1951 |
| 2,578,938 | Kunin et al. | Dec. 18, 1951 |

OTHER REFERENCES

Isbell et al.: Bureau of Standards Journal of Research, vol. 6 (RP 328), pp. 1145–52.